(12) United States Patent
Podgorski et al.

(10) Patent No.: US 10,427,983 B2
(45) Date of Patent: *Oct. 1, 2019

(54) METHOD FOR MANUFACTURING PART MADE OF COMPOSITE MATERIAL

(71) Applicants: SAFRAN AIRCRAFT ENGINES, Paris (FR); SAFRAN, Paris (FR)

(72) Inventors: Michael Podgorski, Moissy-Cramayel (FR); Catherine Billotte Cabre, La Prairie (CA); Bruno Jacques Gérard Dambrine, Moissy-Cramayel (FR); Ludovic Edmond Camille Molliex, Brunoy (FR); Edu Ruiz, Montreal (CA); Sylvain Turenne, Saint-Bruno (CA)

(73) Assignees: SAFRAN AIRCRAFT ENGINES, Paris (FR); SAFRAN, Paris (FR)

(*) Notice: Subject to any disclaimer, the term of this patent is extended or adjusted under 35 U.S.C. 154(b) by 63 days.

This patent is subject to a terminal disclaimer.

(21) Appl. No.: 15/538,762

(22) PCT Filed: Dec. 18, 2015

(86) PCT No.: PCT/FR2015/053626
§ 371 (c)(1),
(2) Date: Jun. 22, 2017

(87) PCT Pub. No.: WO2016/102842
PCT Pub. Date: Jun. 30, 2016

(65) Prior Publication Data
US 2017/0334791 A1    Nov. 23, 2017

(30) Foreign Application Priority Data

Dec. 23, 2014  (FR) ..................... 14 63284

(51) Int. Cl.
*C04B 35/80* (2006.01)
*C04B 35/117* (2006.01)
(Continued)

(52) U.S. Cl.
CPC ............ *C04B 35/806* (2013.01); *B28B 3/006* (2013.01); *B32B 5/30* (2013.01); *C04B 35/117* (2013.01);
(Continued)

(58) Field of Classification Search
CPC ........... B29C 70/44; B32B 5/30; B28B 3/006; C04B 35/806
(Continued)

(56) References Cited

U.S. PATENT DOCUMENTS 4,568,594 A * 2/1986 Hordonneau ......... C04B 35/117
427/376.1
5,489,408 A * 2/1996 Nakano .................... B28B 3/02
264/624
(Continued)

FOREIGN PATENT DOCUMENTS

EP    0 130 105 A1    1/1985

OTHER PUBLICATIONS

"Porex PTFE Membranes." Available Oct. 29, 2014. Retrieved Jul. 18, 2018. <http://www.interstatesp.com/materials/porex/ptfe-membranes/> (Year: 2014).*
(Continued)

*Primary Examiner* — Matthew J Daniels
*Assistant Examiner* — Hana C Page
(74) *Attorney, Agent, or Firm* — Pillsbury Winthrop Shaw Pittman LLP

(57) ABSTRACT

A method of fabricating a part out of composite material, includes forming a fiber texture from refractory fibers; impregnating the fiber texture for a first time with a first slip
(Continued)

containing first refractory particles; eliminating the liquid phase from the first slip so as to leave within the texture only the first refractory particles; impregnating the fiber texture for a second time with a second slip containing second refractory particles; eliminating the liquid phase from the second slip so as to leave within the texture only the second refractory particles and obtain a fiber preform filled with the first and second refractory particles; and sintering the first and second refractory particles present in the fiber preform in order to form a refractory matrix in the preform.

11 Claims, 6 Drawing Sheets

(51) Int. Cl.
| | | |
|---|---|---|
| C04B 35/119 | (2006.01) | |
| C04B 35/14 | (2006.01) | |
| C04B 35/18 | (2006.01) | |
| C04B 35/185 | (2006.01) | |
| C04B 35/488 | (2006.01) | |
| C04B 35/58 | (2006.01) | |
| C04B 35/83 | (2006.01) | |
| B28B 3/00 | (2006.01) | |
| B32B 5/30 | (2006.01) | |
| C04B 35/628 | (2006.01) | |
| C04B 35/64 | (2006.01) | |

(52) U.S. Cl.
CPC ............ *C04B 35/119* (2013.01); *C04B 35/14* (2013.01); *C04B 35/18* (2013.01); *C04B 35/185* (2013.01); *C04B 35/488* (2013.01); *C04B 35/58* (2013.01); *C04B 35/6286* (2013.01); *C04B 35/62849* (2013.01); *C04B 35/62852* (2013.01); *C04B 35/62855* (2013.01); *C04B 35/62857* (2013.01); *C04B 35/62865* (2013.01); *C04B 35/62892* (2013.01); *C04B 35/64* (2013.01); *C04B 35/80* (2013.01); *C04B 35/803* (2013.01); *C04B 35/83* (2013.01); *B32B 2264/107* (2013.01); *C04B 2235/3217* (2013.01); *C04B 2235/3244* (2013.01); *C04B 2235/3418* (2013.01); *C04B 2235/3463* (2013.01); *C04B 2235/3804* (2013.01); *C04B 2235/3817* (2013.01); *C04B 2235/3852* (2013.01); *C04B 2235/447* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/616* (2013.01)

(58) Field of Classification Search
USPC .......................................................... 156/242
See application file for complete search history.

(56) References Cited

U.S. PATENT DOCUMENTS

| | | | |
|---|---|---|---|
| 5,525,374 A * | 6/1996 | Ritland ................. | B01D 29/111 |
| | | | 427/376.1 |
| 6,497,776 B1 | 12/2002 | Butler et al. | |
| 6,533,986 B1 * | 3/2003 | Fosaaen ................. | B28B 3/003 |
| | | | 264/314 |
| 8,309,013 B2 * | 11/2012 | Pasquero .............. | C04B 35/117 |
| | | | 264/621 |
| 9,302,946 B2 * | 4/2016 | Ritti ...................... | C04B 35/117 |
| 2004/0105969 A1 | 6/2004 | Huang et al. | |
| 2014/0161626 A1 | 6/2014 | Podgorski et al. | |
| 2016/0362822 A1 * | 12/2016 | Diss ....................... | C04B 35/803 |

OTHER PUBLICATIONS

International Search Report as issued in International Patent Application No. PCT/FR2015/053626, dated Mar. 11, 2016.

* cited by examiner

METHOD FOR MANUFACTURING PART MADE OF COMPOSITE MATERIAL

CROSS REFERENCE TO RELATED APPLICATIONS

This application is the U.S. National Stage of PCT/FR2015/053626 filed Dec. 18, 2015, which in turn claims priority to French Application No. 1463284, filed Dec. 23, 2014. The contents of both applications are incorporated herein by reference in their entirety.

BACKGROUND OF THE INVENTION

The present invention relates to a method of fabricating a part out of thermostructural composite material, in particular of the oxide/oxide type or of the ceramic matrix composite (CMC) type, i.e. comprising fiber reinforcement made of fibers of refractory material and densified with a matrix that is likewise made of refractory material.

Oxide/oxide composite material parts are generally prepared by taking a plurality of fiber plies made from refractory oxide fibers and draping them in a mold, each ply being previously impregnated with a slip filled with refractory oxide particles. The set of plies as arranged in this way is then compacted using a countermold or a vacuum sheet and passing through an autoclave. The filled preform as obtained in this way is then subjected to sintering in order to form a refractory oxide matrix within the preform and obtain a part made out of oxide/oxide composite material. This technique can also be used for making parts out of ceramic matrix composite (CMC) material. Under such circumstances, the fiber plies are made out of fibers of silicon carbide (SiC) or of carbon and they are impregnated with a slip filled with particles of carbide (e.g. SiC), of boride (e.g. $TiB_2$), or of nitride (e.g. $Si_2N_4$).

Nevertheless, this type of preparation method does not make it possible to fabricate composite material parts having a high matrix fraction and/or of characteristics, e.g. mechanical properties, that vary in the thickness of the material.

OBJECT AND SUMMARY OF THE INVENTION

An object of the present invention is to remedy the above-mentioned drawbacks and to propose a solution that makes it possible to control the fabrication of composite material parts, in particular of the oxide/oxide type or of the CMC type, so as to optimize the volume fraction of the matrix present in the material and/or so as to confer thereon characteristics that vary in the thickness direction of the material.

To this end, the invention provides a method of fabricating a part out of composite material, the method comprising the following steps:
 forming a fiber texture from refractory fibers;
 impregnating the fiber texture for a first time with a first slip containing first refractory particles;
 eliminating the liquid phase from the first slip that has impregnated the fiber texture so as to leave within said texture only the first refractory particles;
 impregnating the fiber texture for a second time with a second slip containing second refractory particles;
 eliminating the liquid phase from the second slip that has impregnated the fiber texture so as to leave within said texture only the second refractory particles and obtain a fiber preform filled with the first and second refractory particles; and
 sintering the first and second refractory particles present in the fiber preform in order to form a refractory matrix in said preform.

Thus, by performing at least two successive impregnations with slips containing particles that are different in size and/or in chemical nature, it is possible to control the matrix volume fraction in the final part and/or the characteristics of the matrix in the thickness direction of the part.

In a first aspect of the invention, the first particles present a mean size greater than the mean size of the second particles. It is thus possible to use the second particles to fill in the gaps that are present between the first particles so as to obtain a high matrix volume fraction in the final part.

The first particles may be of the same chemical nature as the second particles, or they may be of a chemical nature that is different from that of the second particles. By using first and second particles having different chemical natures, it is possible to confer particular properties on the resulting matrix.

In a second aspect of the method of the invention, it further comprises, after the step of eliminating the liquid phase from the second slip and before the sintering step, the following steps:
 impregnating the fiber texture a third time with a third slip containing third refractory particles; and
 eliminating the liquid phase from the third slip that has impregnated the fiber texture so as to leave within said texture only the third refractory particles and obtain a fiber preform filled with the first, second, and third refractory particles.

It is thus possible to deposit particles on the surface of the texture that are different from the particles present in the core of the texture.

Under such circumstances, the third particles may present a mean size similar to the mean size of the first particles, the first and third particles presenting a mean size that is less than the mean size of the second particles. After the matrix has been formed by sintering the particles, this makes it possible to obtain a part presenting a surface shape that is improved since the matrix present at the surface of the part is obtained from particles that are finer than those present in the core of the preform prior to sintering.

In a third aspect of the method of the invention, each of the steps of impregnating the fiber texture comprises:
 placing the fiber texture in a mold having an impregnation chamber including in its bottom portion a part made of porous material on which a first face of said texture rests, the impregnation chamber being closed in its top portion by a deformable impermeable diaphragm placed facing a second face of the fiber texture, said diaphragm separating the impregnation chamber from a compacting chamber;
 injecting a slip containing a powder of refractory particles into the impregnation chamber between the second face of the fiber texture and the diaphragm;
 injecting a compression fluid into the compacting chamber, the fluid exerting pressure on the diaphragm to force the slip to pass through the fiber texture; and each step of eliminating the liquid phase from the slip comprising draining the liquid phase of the slip that has passed through the fiber texture via the porous material part, the refractory particles being retained inside said texture by said porous material part.

By using a porous material part serving to drain the liquid from the slips, the method of the invention makes it possible to eliminate the liquid phase from the slip introduced into the fiber texture without eliminating the refractory solid particles that are also present in the texture. Eliminating the liquid phase of the slip by draining also makes it possible to avoid disturbing the distribution of refractory particles within the fiber texture and consequently makes it possible to control the structure of the matrix in the final part.

The porous material part may be rigid and may present a shape matching the shape of the composite material part that is to be made. In a variant, the porous material part may be deformable, the bottom of the mold presenting a shape corresponding to the shape of the composite material part that is to be made; under such circumstances, the porous material part matches the shape of the bottom of the mold.

The yarns of the preform may be formed by fibers made up of one or more of the following materials: alumina, mullite, silica, an aluminosilicate, a borosilicate, silicon carbide, and carbon.

The refractory particles may be made of a material selected from: alumina, mullite, silica, an aluminosilicate, an aluminophosphate, zirconia, a carbide, a boride, and a nitride.

In an embodiment, the composite material part that is obtained constitutes a turbine engine blade.

BRIEF DESCRIPTION OF THE DRAWINGS

Other characteristics and advantages of the invention appear from the following description of particular implementations of the invention given as non-limiting examples, and with reference to the accompanying drawings, in which.

DETAILED DESCRIPTION OF IMPLEMENTATIONS

Figure 1:
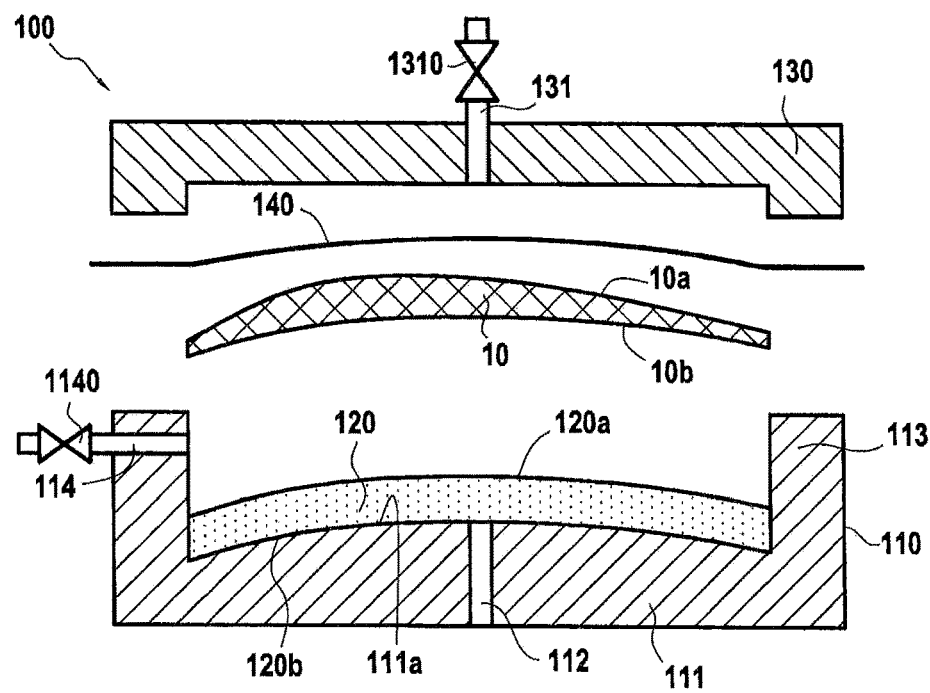
FIG. 1 is a diagrammatic exploded section view of tooling in accordance with an embodiment of the invention.

The method in accordance with the present invention for fabricating a part out of thermostructural composite material, in particular of the oxide/oxide type or of the CMC type, begins by making a fiber texture that is to form the reinforcement of the part.

The fiber texture used may be various kinds and shapes, such as in particular:
fabric obtained by two-dimensional (2D) weaving;
fabric obtained by three-dimensional (3D) weaving;
braid;
knit;
felt; and
unidirectional (UD) sheets of yarns or tows, or multidirectional (nD) sheets obtained by superposing a plurality of UD sheets in different directions and bonding the UD sheets together, e.g. by stitching, by a chemical bonding agent, or by needling.

It is also possible to use a fiber structure made up of a plurality of superposed layers of fabric, braid, knit, felt, sheets, tows, etc., which layers are bonded together, e.g. by stitching, by implanting yarns or rigid elements, or by needling.

The term "two-dimensional weaving" is used herein to mean a conventional weaving technique in which each weft yarn passes from one side to the other of yarns in a single layer of warp yarns, or vice versa.

The term "three-dimensional weaving" or "3D weaving", or indeed "multilayer weaving" is used herein to mean weaving in which at least some of the weft yarns interlink warp yarns in a plurality of layers of warp yarns, or vice versa, by weaving with a weave that may in particular be selected from the following weaves: interlock, multi-plain, multi-satin, and multi-twill.

The yarns used for weaving the fiber texture that is to form the fiber reinforcement of the oxide/oxide or CMC composite material part may in particular be made of fibers constituted by any of the following material: alumina, mullite, silica, an aluminosilicate, a borosilicate, silicon carbide, carbon, or a mixture of two or more of these materials.

Once the fiber texture has been made, it is impregnated in succession with at least two different slips in accordance with the invention.

A first implementation of the method of the invention is described that consists in making a part out of oxide/oxide composite material having its matrix formed from two types of refractory oxide particle, namely a first type of particle having a mean size greater than the mean size of the particles of the second type. As explained in detail below, by depositing in succession first particles and the second particles of mean size smaller than the first particles in the fiber texture, the filling of the texture with the refractory oxide particles is optimized and the micropores in the final material are significantly reduced. The first and second refractory oxide particles may have the same chemical nature or they may have different chemical natures. By modifying the chemical nature of the second particles, it is possible to act on the sintering conditions for the first particles. For example, introducing second particles of zirconia makes it possible to lower the sintering temperature for first particles of alumina. The fiber texture in this example is impregnated using tooling in accordance with the invention, which is particularly adapted to enable slips filled with solid particles to be introduced into 2D fiber textures of considerable thickness (a stack of 2D woven plies) or into 3D textures presenting complex shapes.

A fiber texture 10 is placed in the tooling 100. In the presently-described example, the fiber texture 10 is made using the above-defined techniques (e.g. stacking 2D plies or 3D weaving) using Nextel 610™ alumina yarns. In this example, the fiber texture 10 is for forming the fiber reinforcement of a blade made of oxide/oxide composite material.

The tooling 100 comprises a mold 110 having a bottom 111 that is provided with a vent 112. The mold 110 also has a side wall 113 having an injection port 114 fitted with a valve 1140. A part 120 made of porous material is placed on the inside surface 111a of the bottom 111. The part made of porous material 120 has a bottom face 120b in contact with the inside surface 111a of the bottom 111 and a top face 120a for receiving the fiber texture 10. In the presently-described example, the part 120 is made with a deformable material, while the inside surface 111a of the bottom 111 of the mold 110 presents a shape or a profile corresponding to the shape of the final part that is to be fabricated, specifically an aeroengine blade in this example. Since the part 120 is deformable, it matches the profile of the inside surface 111a of the bottom 111 and presents on its top face 120a a shape similar to the shape of the surface 111a. By way of example, the part 120 may be made out of microporous polytetrafluoroethylene (PTFE), such as the "microporous PTFE" product sold by the supplier Porex®.

In a variant implementation, the porous material part is rigid and presents a top face of shape corresponding to the shape of the final part that is to be fabricated. Under such circumstances, the part may be made in particular by thermoforming.

By way of example, the porous material part may present thickness of several millimeters and a mean pore fraction of about 30%. The mean pore size (D50) of the part made of porous material may lie in the range 1 micrometer (µm) to 2 µm, for example.

The tooling 100 also includes a lid 130 having an injection port 131 with a valve 1310 and a deformable diaphragm 140, which diaphragm, once the tooling has been closed (FIG. 2) separates an impregnation chamber 110 in which the fiber texture 10 is present from a compacting chamber 102 situated above the diaphragm 140. The diaphragm 140 may be made of silicone, for example.

Figure 2:
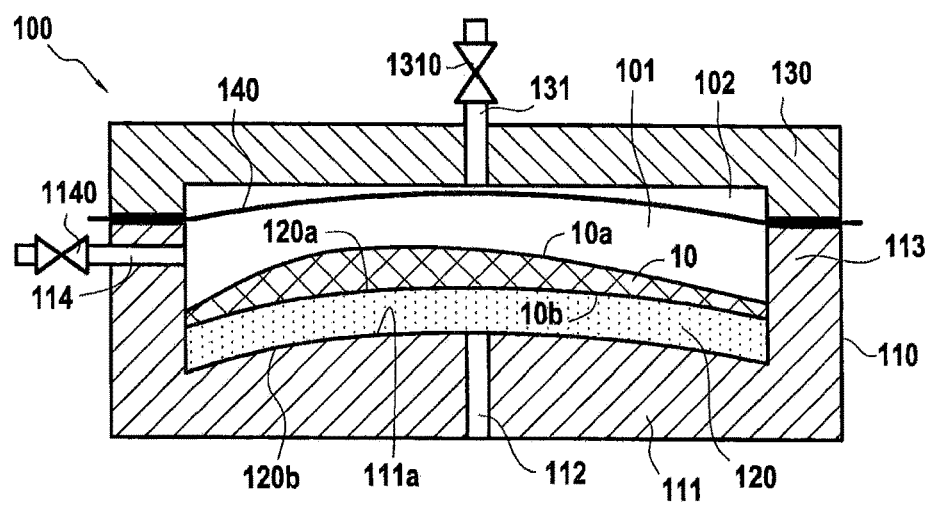
FIG. 2 is a diagrammatic section view showing the FIG. 1 tooling when closed with a fiber texture in position therein.
Figure 3:
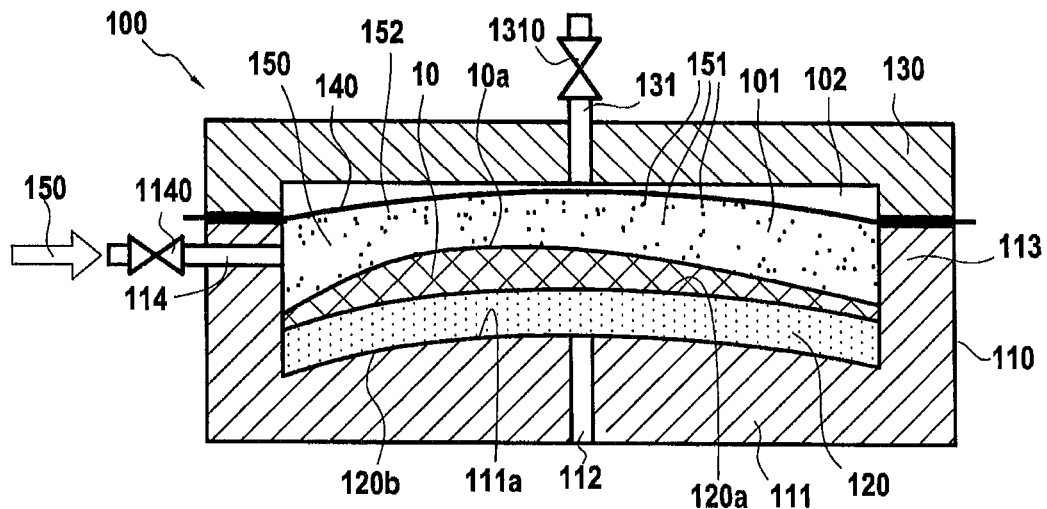
FIGS. 3 to 6 are diagrammatic section views showing two successive steps of impregnating a fiber texture with slip filled with particles of different respective sizes in the tooling of FIG. 2, in accordance with an implementation of the method of the invention.

After placing the texture 10 on the top face 120a of the porous material part 120a, the mold 110 is closed with the lid 130 (FIG. 2). A first slip 150 is then injected into the impregnation chamber 101 via the injection port 114 having its valve 1140 open (FIG. 3). In this example, the slip 150 is for forming a portion of the refractory oxide matrix in the texture. The slip 150 corresponds to a powder of alumina particles 151 in a suspension in a liquid phase 152, the particles presenting a mean particle size lying in the range 0.1 µm to 10 µm. The liquid phase 152 of the slip may in particular be constituted by water (acid pH), ethanol, or any other liquid in which it is possible to put the desired powder into suspension. An organic binder may also be added (e.g. polyvinyl alcohol (PVA) which is soluble in water). The binder serves to ensure that the green preform holds together after drying and before sintering.

In addition to alumina, the refractory oxide particles may equally well be a material selected from mullite, silica, zirconia, an aluminosilicate, and an aluminophosphate. As a function of their base composition, the refractory oxide particles may also be mixed with particles of alumina, of zirconia, of aluminosilicate, of rare earth oxides, of rare earth disilicates (e.g. used in environmental or thermal barriers), or any other filler suitable for adding specific functions to the final material (carbon black, graphite, silicon carbide, etc.).

The quantity of slip 150 that is injected into the impregnation chamber 101 is determined as a function of the volume of the fiber texture 10 that is to be impregnated. It is the quantity of powder initially introduced that controls the final settling thickness and thus the fiber volume fraction (Fvf) and the matrix volume fraction (Mvf).

Figure 4:
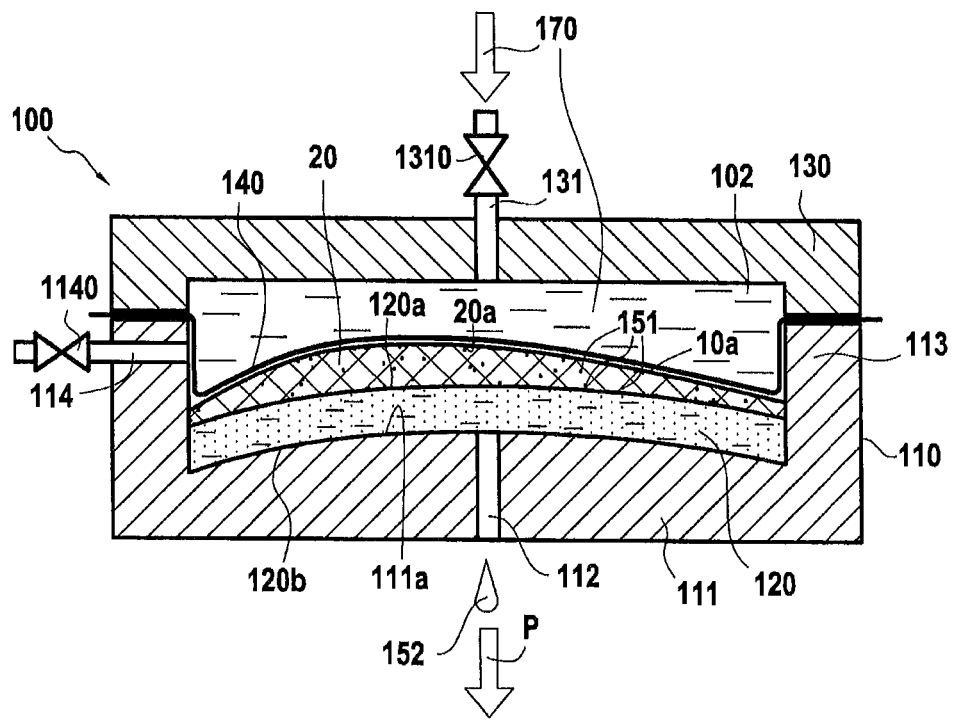

Once the slip 150 has been injected into the impregnation chamber 101, the compacting operation is performed by injecting a compression fluid 170, e.g. oil, into the compacting chamber 102 via the injection port 131 having its valve 1310 open, after the valve 1140 of the injection port 114 has been closed (FIG. 4). The compression fluid 170 applies pressure on the slip 150 through the diaphragm 140, forcing the slip 150 to penetrate into the fiber texture 10. The fluid 170 imposes hydrostatic pressure over the entire diaphragm 140, and consequently on all of the slip present above the texture 10. The pressure applied by the diaphragm 140 on the slip and on the fiber texture is preferably less than 15 bar, e.g. 7 bar, so as to cause the slip to penetrate into the texture and compact the texture sufficiently to enable the liquid phase of the slip to be drained via the porous material part without degrading the resulting preform.

Several functions are performed by the porous material part 120 that is situated beside the face 10b of the fiber texture that is opposite from the face 10a through which the slip penetrates into the texture (FIG. 3). Specifically, the part 120 enables the liquid of the slip to be drained out from the fiber texture, with the liquid as drained in this way being discharged in this example via the vent 112 (FIG. 4). The draining is performed both during and after the compacting operation. When no more liquid runs out through the vent 112, draining has terminated. In combination with applying a pressure on the slip by means of a compression fluid, it is possible to apply pumping P, e.g. by means of a primary vacuum pump (not shown in FIGS. 1 to 4) via the vent 112. Such pumping is optional. Heating may suffice. Nevertheless, the combination of both of them enables drying to be accelerated.

In addition, the tooling may be provided with heater means, such as resistor elements incorporated in the walls of the tooling, so as to increase the temperature inside the compacting chamber and facilitate exhausting the liquid from the slip by evaporation. The temperature in the compacting chamber may be raised to a temperature lying in the range 80° C. to 105° C.

The porous material part 120 also makes it possible to retain the solid particles of refractory oxide that are present in the slip, with the refractory oxide particles thus becoming deposited progressively by settling in the fiber texture.

The part 120 also makes it possible to keep the fiber texture in shape during the compacting operation, since its top face 120a reproduces the shape of the bottom 111 of the mold 100 corresponding to the shape of the final part that is to be fabricated.

An intermediate fiber preform 20 is thus obtained that is filled with refractory oxide particles, in this example alumina particles 151 (FIG. 4). The intermediate preform is then released from the compacting pressure by emptying the compression fluid out from the compacting chamber 102, with the preform nevertheless conserving its compacted shape.

Figure 5:
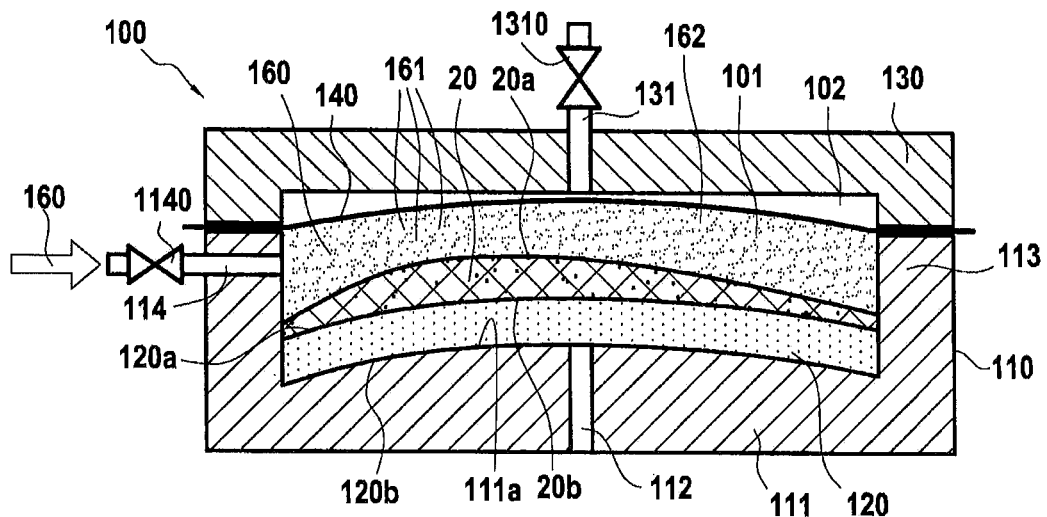

After a possible cooling stage, the intermediate fiber preform 20 is impregnated with a second slip 160 that is injected through the injection port 114 after its valve 1140 has been opened (FIG. 5). In this example, the slip 160 is for finishing off the forming of the refractory oxide matrix in the preform. The slip 160 corresponds to a powder of alumina particles 161 in suspension in a liquid phase 162. The alumina particles 161 present a mean particle size that is less than that of the particles 151, and that may lie in the range 0.1 µm to 1 µm (a factor of 10 between the large particles and the finer particles). The liquid phase 162 of the slip may in particular be constituted by water (acid pH), ethanol, or any other liquid in which it is possible to put the desired powder into suspension. An organic binder may also be added (e.g. PVA, which is soluble in water). The binder serves to ensure that the green preform holds together after drying and before sintering. The liquid phase 162 is preferably of the same nature as the liquid phase 152.

The quantity of slip 160 injected into the impregnation chamber 101 is determined as a function of the volume of the intermediate fiber preform 20 that is to be impregnated.

Figure 6:
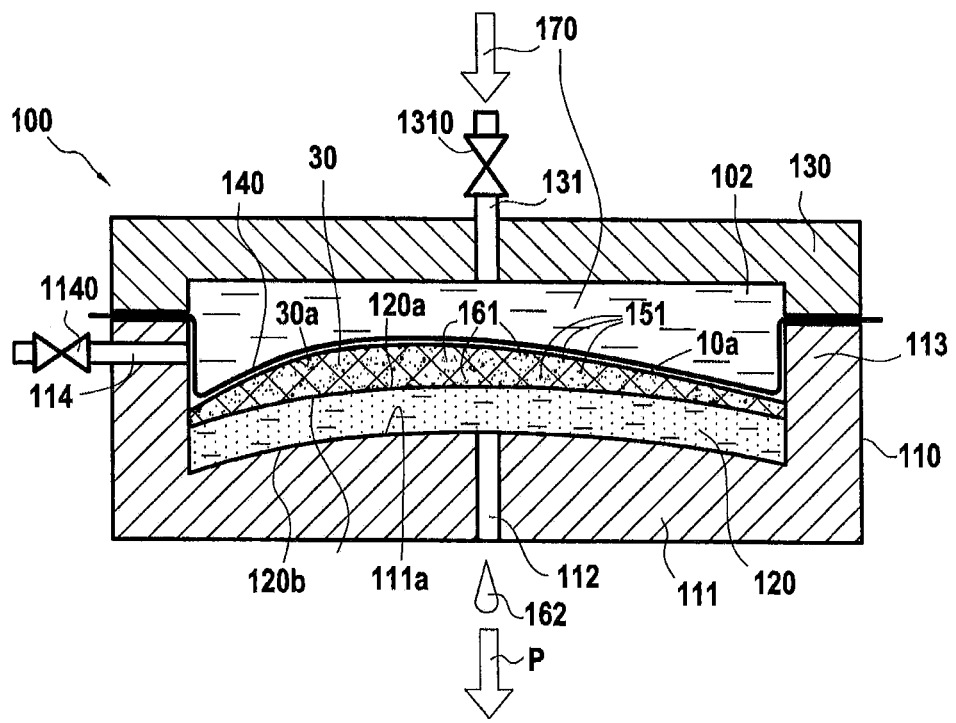

Once the slip 160 has been injected into the impregnation chamber 101, the compacting operation is performed by once more injecting the compression fluid 170 into the compacting chamber 102 via the injection port 131 with its valve 1310 open, the valve 1140 of the injection port 114 previously being closed (FIG. 6). The compression fluid 170 applies pressure on the slip 160 through the diaphragm 140, which forces the slip 160 to penetrate into the intermediate fiber preform 20. The pressure applied by the diaphragm 140 on the slip and on the preform is preferably less than 15 bar, e.g. 7 bar, so as to cause the slip to penetrate into the texture and so as to compact the texture sufficiently to enable the liquid phase of the slip to be drained via the porous material part without degrading the preform.

When liquid no longer flows out through the vent 112, draining has terminated. In combination with applying pressure on the slip by the compression fluid, it is possible to perform pumping P, e.g. by using a primary vacuum pump (not shown in FIGS. 1 to 4) to the vent 112. This pumping is optional. Heating might suffice. Nevertheless, both of them in combination can accelerate drying.

Furthermore, the temperature in the compacting chamber may be raised so as to facilitate discharging the liquid from the slip by evaporation, e.g. at a temperature lying in the range 80° C. to 105° C.

The alumina particles 161 are retained in the preform by the porous material part 120. Since the particles 161 are of mean size smaller than that of the particles 151, they become deposited by settling in the gaps that remain between the previously deposited particles 151.

A fiber preform 30 is thus obtained that is filled with alumina particles 151 and 161 (FIG. 6). The preform is then released from the compacting pressure by emptying the compression fluid out from the compacting chamber 102.

The preform is then extracted from the tooling and subjected to sintering heat treatment in air at a temperature lying in the range 1000° C. to 1200° C. in order to sinter the refractory oxide particles together, thereby forming a refractory oxide matrix in the preform. This produces a part made of oxide/oxide composite material having fiber reinforcement obtained by 3D weaving that presents a highly controlled volume fraction of micropores, and consequently a very small volume fraction of macropores.

In addition to alumina, the refractory oxide particles 151 and 161 could equally well be of a material selected from mullite, silica, zirconia, an aluminosilicate, and an aluminophosphate. As a function of their base composition, the refractory oxide particles may also be mixed with particles of alumina, zirconia, of aluminosilicate, of rare earth oxides, of rare earth disilicates (e.g. used in environmental or thermal barriers) or any other filler serving to add specific functions to the final material (carbon black, graphite, silicon carbide, etc.).

A CMC composite material part can be obtained in the same manner by making a fiber texture with silicon carbide fibers or carbon fibers and using a slip filled with carbide particles (e.g. SiC), boride particles (e.g. $TiB_2$), or nitride particles (e.g. $Si_3N_4$).

There follows a description of a second implementation of the method of the invention consisting in making a part out of CMC composite material having its final surface state controlled by the method of the invention. More precisely, and as explained in detail below, by depositing in the vicinity of the surface of the fiber texture refractory particles that have a mean size that is significantly smaller than that of the refractory particles deposited in the core of the texture, the micropores in the final material are significantly reduced while obtaining a final part that presents a smoother surface state that is compatible with aerodynamic applications. The refractory particles may be of the same chemical nature or they may be of different chemical natures.

In this example, the fiber texture is impregnated using tooling 200 similar to the tooling 100 described above with reference to FIGS. 1 to 6, and consequently, it comprises the same elements, namely:
 a mold 210 having a bottom 211 provided with a vent 212 and a side wall 213 including an injection port 214 fitted with a valve 2140 (FIG. 7);
 a lid 230 having an injection port 231 fitted with a valve 2310 and a deformable diaphragm 240, e.g. made of silicone, that serves, once the tooling has been closed (FIG. 7), to separate an impregnation chamber 201 in which a fiber texture 40 is present from a compacting chamber 202 situated above the diaphragm 240; and
 a porous material part 220 placed on the inside surface 211a of the bottom 211 and having a bottom face 220b in contact with the inside surface 211a of the bottom 211 and a top face 220a for receiving the fiber texture 40.

In the presently-described example, the porous material part 220 is made of a rigid material and the top face 220a of the porous material part 220 presents a shape corresponding to the shape of the final part that is to be fabricated, specifically an aeroengine blade.

Still in the presently-described example, the fiber texture 40 is made out of silicon carbide fibers by using one of the above-described techniques. The fiber texture 40 in this example is to form the fiber reinforcement of an SiC/SiC composite material blade, i.e. a blade made of a CMC material comprising SiC fiber reinforcement densified by an SiC matrix.

Figure 7:
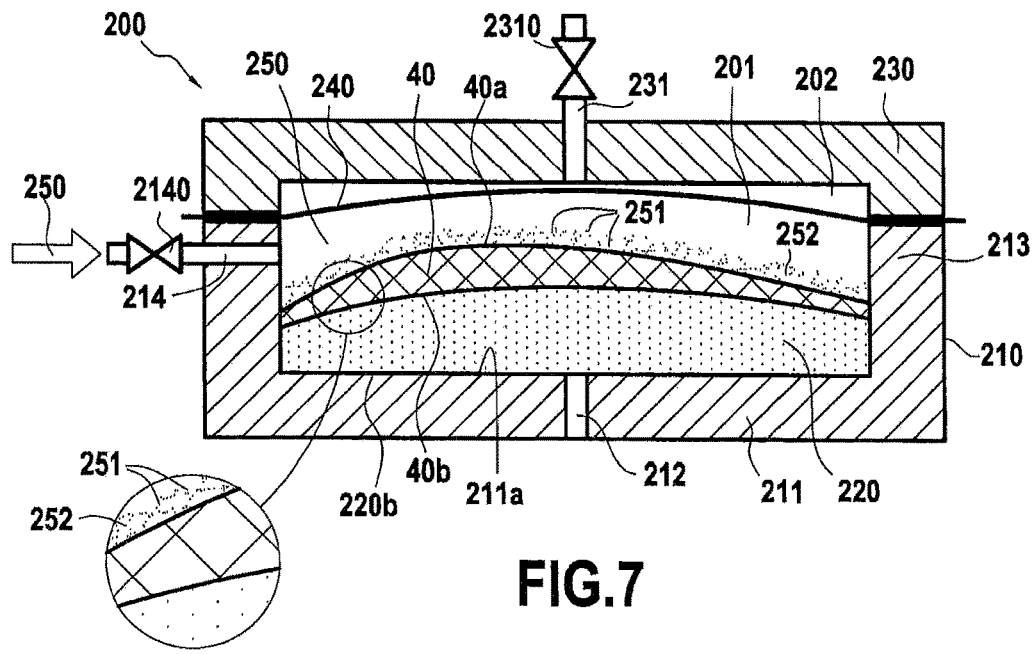
FIGS. 7 to 12 are diagrammatic section views showing three successive steps of impregnating a fiber texture with slips filled with particles of different respective sizes in accordance with another implementation of the method of the invention.

After the texture 40 has been placed on the top face 220a of the porous material part 220 and after the mold 210 has been closed with the lid 230, a first slip 250 is injected into the impregnation chamber 201 via the injection port 214 while its valve 2140 is open (FIG. 7). The slip 250 is for forming the portion of the matrix that is present at the bottom face 40b of the texture 40, which portion contributes to the surface state of the bottom face of the final part. The slip 250 corresponds to a powder of SiC particles 251 in suspension in a liquid phase 252, the particles presenting a mean particle size lying in the range 0.1 μm to 5 μm. The liquid phase 252 of the slip may in particular be constituted by water (acid pH), ethanol, or any other liquid in which it is possible to put the desired powder into suspension. An organic binder may also be added (e.g. PVA, which is soluble in water). This binder serves to ensure that the green preform holds together after drying and before sintering.

The quantity of slip 250 injected into the impregnation chamber 201 is determined as a function of the thickness of the layer of particles 251 that it is desired to form starting from the bottom face of the texture.

Figure 8:
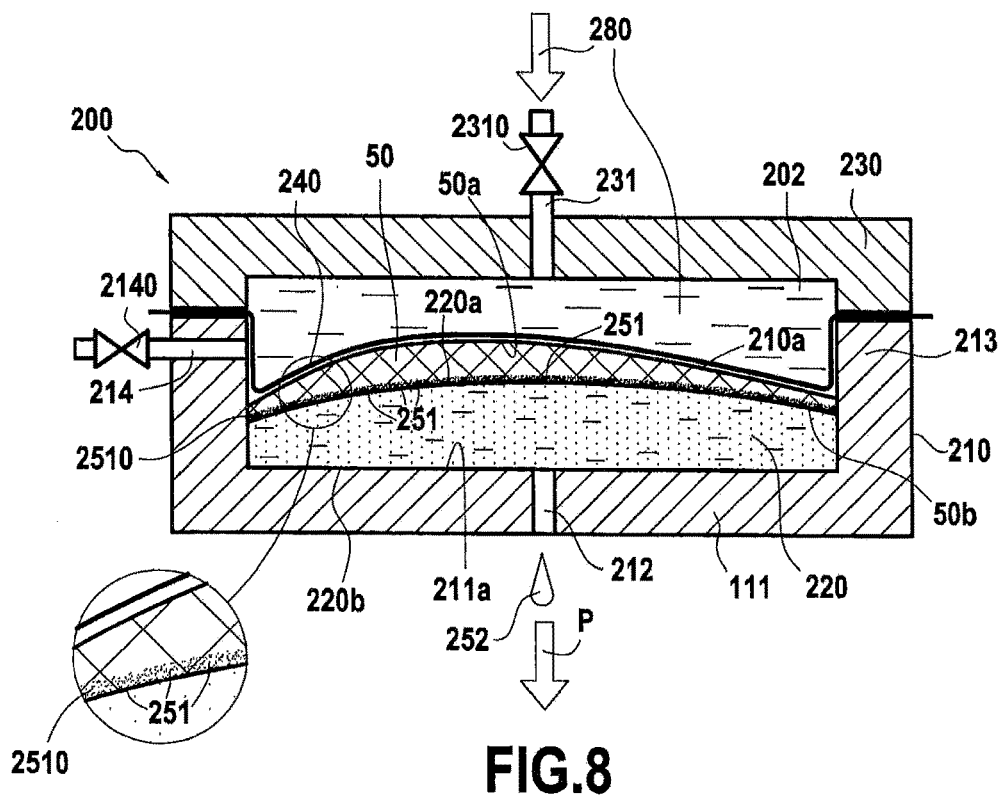

Once the slip 250 has been injected into the impregnation chamber 201, the compacting operation is performed by injecting a compression fluid 280, e.g. oil, into the compacting chamber 202 via the injection port 231 with its valve 2310 open, the valve 2140 of the injection port 214 previously being closed (FIG. 8). The compression fluid 280 applies pressure on the slip 250 through the diaphragm 240, which forces the slip 250 to penetrate into the fiber texture 40. The particles 251 retained by the porous material part 220 become deposited by settling starting from the bottom face 40b of the texture 40, while the liquid phase 252 of the slip is drained away from the texture 40 by the part 220.

When no more liquid flows through the vent 112, the draining via the porous material part 220 has terminated. In combination with the application of pressure on the slip by the compression fluid, it is also possible to apply pumping P, e.g. by means of a primary vacuum pump (not shown in FIGS. 1 to 4) to the vent 112. This pumping is optional. Heating might suffice. Nevertheless, the combination of both serves to accelerate drying.

After drying and possibly also pumping, an intermediate fiber preform 50 is thus obtained having a layer 2510 of SiC particles 251 on its bottom face 50b. The intermediate preform 50 is then released from the compacting pressure by emptying the compression fluid out from the compacting chamber 202.

Figure 9:
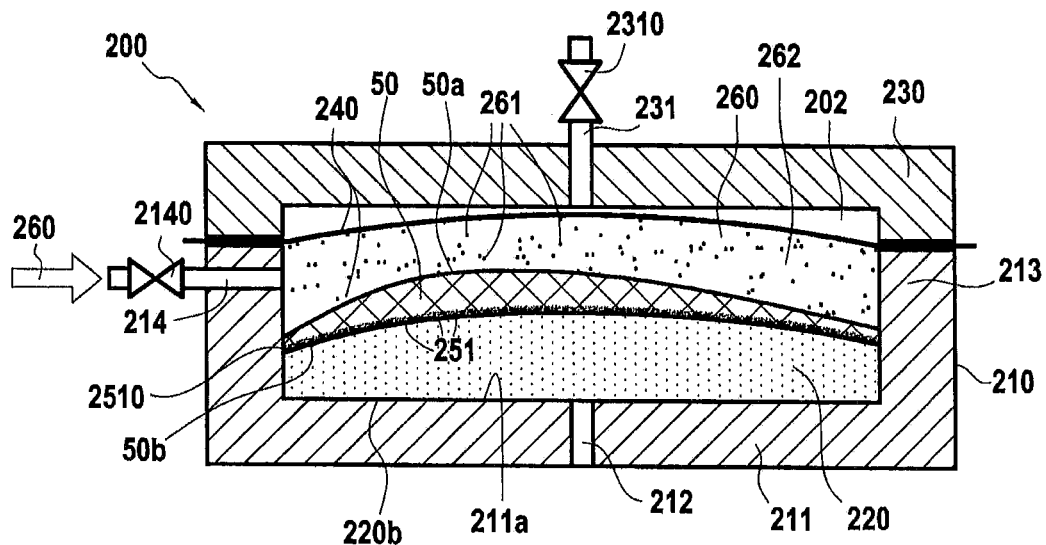

Possibly after a stage of cooling, the intermediate fiber preform 50 is impregnated with a second slip 260 that is injected via the injection port 214 with its valve 2140 open (FIG. 9). The slip 260 is for forming the refractory matrix in the core of the preform 50, i.e. in the thickness of the preform 50 situated between the bottom and top faces 50b and 50a. The slip 260 corresponds to a powder of SiC particles 261 in suspension in a liquid phase 262. The SiC particles 261 present a mean particle size that is greater than that of the particles 251, and that may lie in the range 0.1 μm to 5 μm. The liquid phase 162 of the slip may in particular be constituted by water (acid pH), by ethanol, or by other liquid in which it is possible to put the desired powder into suspension. An organic binder may also be added (e.g. PVA, which is soluble in water). This binder makes it possible to ensure that the green preform holds together after drying and before sintering. The liquid phase 262 is preferably of the same nature as the liquid phase 252.

The quantity of slip 260 injected into the impregnation chamber 201 is determined as a function of the thickness of the intermediate fiber preform 40 that is to be impregnated.

Figure 10:
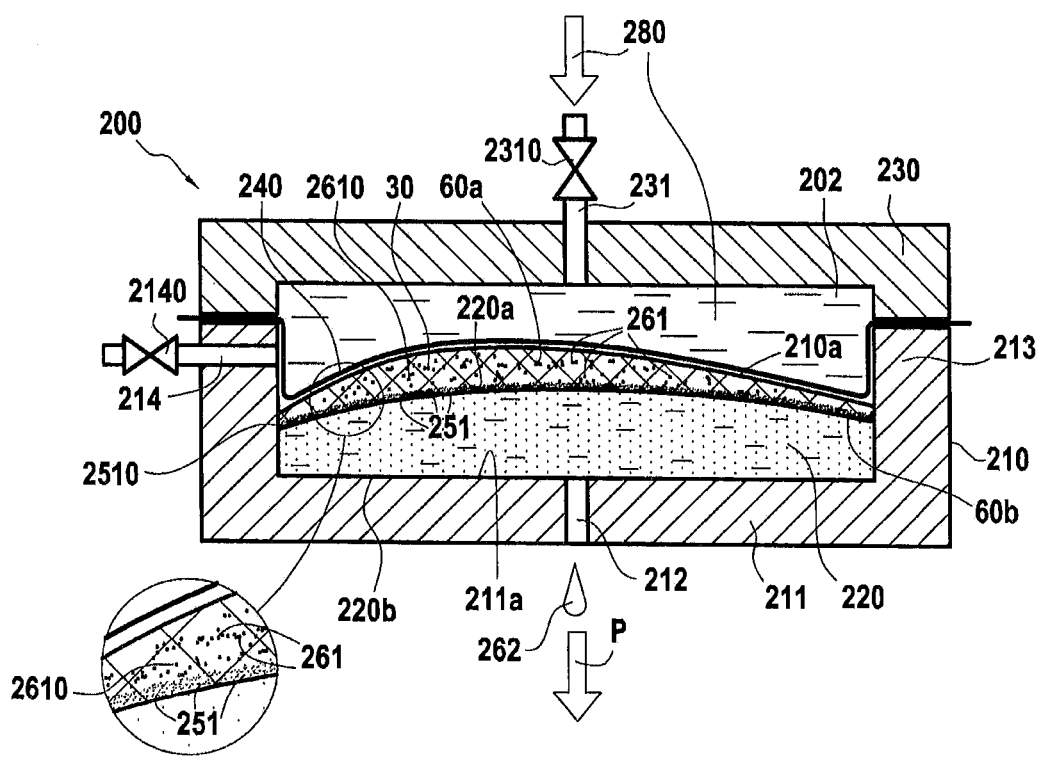

Once the slip 260 has been injected into the impregnation chamber 201, the compacting operation is performed by injecting the compression fluid 280 once again, as described above. During the compacting operation, the particles 261 retained by the porous material part 220 become deposited by settling inside the preform, while the liquid 262 of the slip 260 is drained from the preform through the part 220 (FIG. 10).

This produces an intermediate fiber preform 60 having a layer 2510 of SiC particles 251 on its bottom face 60b, and a layer 2610 of SiC particles 260 extending through the thickness of the preform. The intermediate preform 60 is then released from the compacting pressure by emptying the compression fluid out from the compacting chamber 202.

Figure 11:
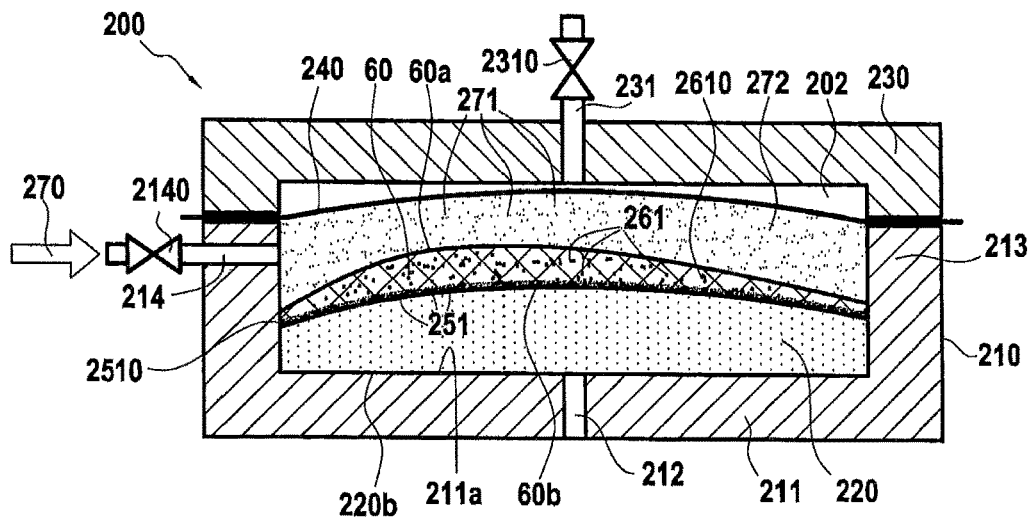
Figure 12:
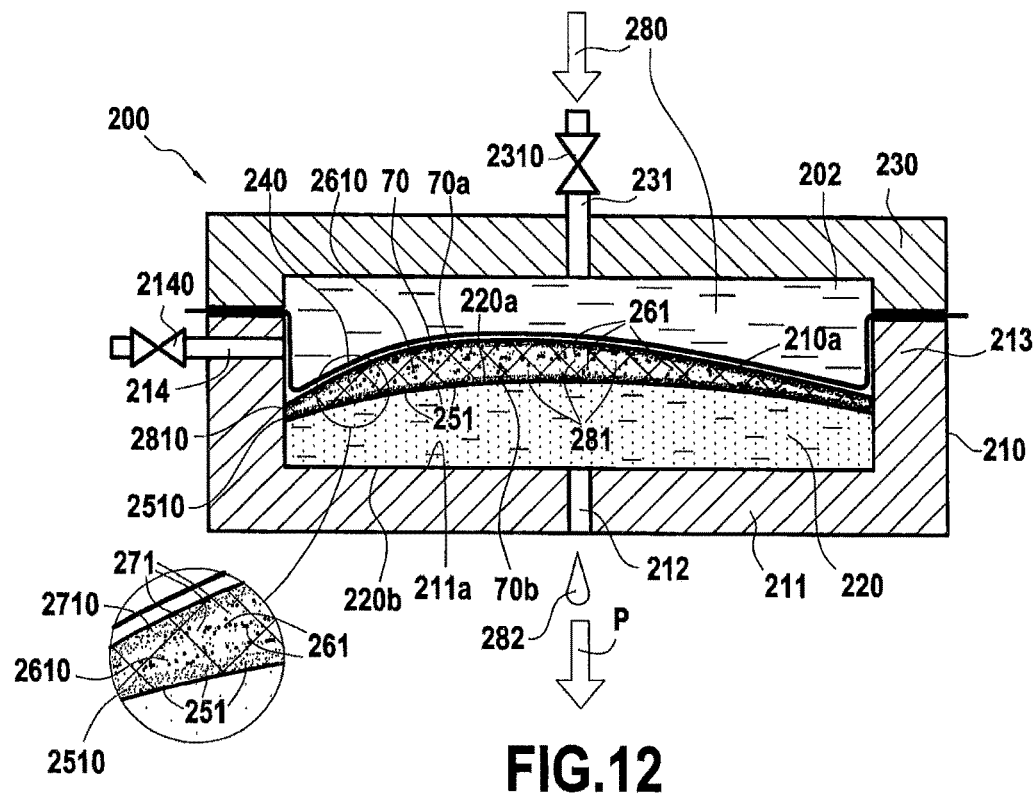

After an optional cooling stage, the intermediate fiber preform 60 is impregnated with a third slip 270 that is injected via the injection port 214 with its valve 2140 open (FIG. 11). The slip 270 is intended firstly to finish off forming the SIC matrix in the core of the preform 60, i.e. in the thickness of the preform 40 situated between the bottom and top faces 40b and 40a, and secondly to form the portion of the matrix that is present on the top face 60a of the preform 60, which portion participates in the surface state of the top face of the final part. The slip 270 corresponds to a powder of SiC particles 271 in suspension in a liquid phase 272, the particles 271 presenting a mean particle size lying in the range 0.1 μm to 5 μm. The liquid phase 272 of the slip may in particular be constituted by any of the above-described phases and is preferably of the same kind as the liquid phases 252 and 262. The particles 271 may have the same size as the particles 251. Nevertheless, they may be of a size that is different from that of the particles 251 if it is desired to have surface states on the bottom face and on the top face of the final part that are different.

The quantity of slip 270 that is injected into the impregnation chamber 201 is determined as a function both of the thickness of the layer of particles 271 that it is desired to form starting from the top face of the texture and also of the volume of the gaps that are present between the particles 261 and that need to be filled in with the particles 271.

Once the slip 270 has been injected into the impregnation chamber 201, the compacting operation is performed by injecting the compression fluid 280 once more, as described above. During the compacting operation, the particles 271 become deposited by settling, initially in the gaps present between the particles 261, and then on the top face 60a of the preform 60, while the liquid 271 of the slip 270 is drained from the preform through the part 220. In combination with applying pressure on the slip by means of the compression fluid, it is possible to apply pumping P, e.g. by means of a primary vacuum pump (not shown in FIGS. 1 to 4) to the vent 112. This pumping is optional. Heating might suffice. Nevertheless, combining both enables drying to be accelerated.

A final fiber preform 70 is thus obtained that has a layer 2510 of SiC particles 251 on its bottom face 70b, a layer 2610 of SiC particles 261 extending over the thickness of the preform, together with particles 271 in the gaps, and a layer 2710 of SiC particles 271 on the top face 70a. The final preform 70 is then unmolded by emptying the compression fluid out from the compacting chamber 202.

The preform 70 is extracted from the tooling and subjected to sintering heat treatment in air at a temperature lying in the range 1800° C. to 2000° C. in order to sinter the refractory SiC particles together so as to form an SiC matrix in the preform. An SiC/SiC composite material part is thus obtained that has fiber reinforcement obtained by 3D weaving and that presents a micropore volume fraction that is very small and a surface state that is improved and that is compatible with aerodynamic applications.

A part made of oxide/oxide composite material may be obtained in the same way by making the fiber texture using refractory oxide fibers (e.g. alumina fibers) and by using a slip filled with refractory oxide particles (e.g. of alumina, mullite, silica, etc.).

The steps of impregnating a fiber structure with a plurality of slips and the steps of eliminating the liquid phase from each slip may also be performed with techniques other than that described above, while using the tooling 100 or 200. It is also possible to use techniques of the infusion type, of the injection molding type known as resin transfer molding (RTM), or methods involving suction of submicrometer powder, known as advanced powder solutions (APS), to perform the steps of impregnating a texture for a fiber preform with slips and the steps of eliminating the liquid phase of each slip.

The invention claimed is:

1. A method of fabricating a part out of composite material, the method comprising:
   forming a fiber texture from refractory fibers;
   impregnating the fiber texture for a first time with a first slip containing first refractory particles;
   eliminating the liquid phase from the first slip that has impregnated the fiber texture so as to leave within said texture only the first refractory particles;
   impregnating the fiber texture for a second time with a second slip containing second refractory particles;
   eliminating the liquid phase from the second slip that has impregnated the fiber texture so as to leave within said texture only the second refractory particles and obtain a fiber preform filled with the first and second refractory particles; and sintering the first and second refractory particles present in the fiber preform in order to form a refractory matrix in said preform;

wherein each of the first and second steps of impregnating the fiber texture comprises:

placing the fiber texture in a mold having an impregnation chamber including in its bottom portion a part made of porous material on which a first face of said texture rests, the impregnation chamber being closed in its top portion by a deformable impermeable diaphragm placed facing a second face of the fiber texture, said diaphragm separating the impregnation chamber from a compacting chamber;

injecting a slip containing a powder of refractory particles into the impregnation chamber between the second face of the fiber texture and the diaphragm;

injecting a compression fluid into the compacting chamber, the fluid exerting pressure on the diaphragm to force the slip to pass through the fiber texture; and wherein each step of eliminating the liquid phase from the slip comprises draining the liquid phase of the slip that has passed through the fiber texture via the porous material part, the refractory particles being retained inside said texture by said porous material part.

2. A method according to claim 1, wherein the first particles present a mean size greater than the mean size of the second particles.

3. A method according to claim 1, wherein the first particles are of the same chemical nature as the second particles.

4. A method according to claim 1, wherein the first particles are of a chemical nature that is different from that of the second particles.

5. A method according to claim 1, further comprising, after the step of eliminating the liquid phase from the second slip and before the sintering step:

impregnating the fiber texture a third time with a third slip containing third refractory particles; and eliminating the liquid phase from the third slip that has impregnated the fiber texture so as to leave within said texture only the third refractory particles and obtain a fiber preform filled with the first, second, and third refractory particles.

6. A method according to claim 5, wherein the first and third particles present a mean size in a range 0.1 µm to 5 µm, and wherein the first and third particles present a mean size that is greater than the mean size of the second particles.

7. A method according to claim 1, wherein the porous material part is rigid and presents a shape matching the shape of the composite material part that is to be made.

8. A method according to claim 1, wherein the porous material part is deformable and the bottom of the mold presents a shape corresponding to the shape of the composite material part that is to be made, the porous material part taking on the shape of the bottom of the mold.

9. A method according to claim 1, wherein the yarns of the preform are formed by fibers made up of one or more of the following materials: alumina, mullite, silica, an aluminosilicate, a borosilicate, silicon carbide, and carbon.

10. A method according to claim 1, wherein the refractory particles are made of a material selected from: alumina, mullite, silica, an aluminosilicate, an aluminophosphate, zirconia, a carbide, a boride, and a nitride.

11. A method according to claim 1, wherein the composite material part that is obtained constitutes a turbine engine blade.

\* \* \* \* \*